United States Patent

[11] 3,582,821

| [72] | Inventors | Eugene I. Gordon<br>Convent Station;<br>Edward F. Labuda, Madison, both of, N.J. |
|---|---|---|
| [21] | Appl. No. | 385,159 |
| [22] | Filed | July 27, 1964 |
| [45] | Patented | June 1, 1971 |
| [73] | Assignee | Bell Telephone Laboratories, Incorporated<br>New York, N.Y. |

[54] DIRECT CURRENT EXCITED ION LASER INCLUDING GAS RETURN PATH
11 Claims, 1 Drawing Fig.

| [52] | U.S. Cl. | 331/94.5, 330/4.3 |
|---|---|---|
| [51] | Int. Cl. | H01s 3/02 |
| [50] | Field of Search | 331/94.5; 330/4.3 |

[56] References Cited
UNITED STATES PATENTS

| 3,117,248 | 1/1964 | Lake | 313/187 |
| 3,395,364 | 7/1968 | Bridges | 331/94.5 |
| 3,321,714 | 5/1967 | Tien | 331/94.5 |
| 3,242,439 | 3/1966 | Rigden et al. | 331/94.5 |

FOREIGN PATENTS

| 1,347,722 | 11/1963 | France | 331/94.5 |

Primary Examiner—William L. Sikes
Attorneys—R. J. Guenther and Arthur J. Torsiglieri CLAIM: 1. An ion laser comprising: a linear discharge tube; said tube being filled with a quantity of gas which is capable of population inversion in an ionized condition; means for establishing a substantially continuous gas discharge through said gas; means for maintaining a sufficiently high current flow through said gas to ionize a significant proportion of said gas and to establish a population inversion of component ions; enclosures attached to opposite ends of said discharge tube; and means for equalizing the gas pressures along said discharge tube comprising an auxiliary tube interconnecting said enclosures.

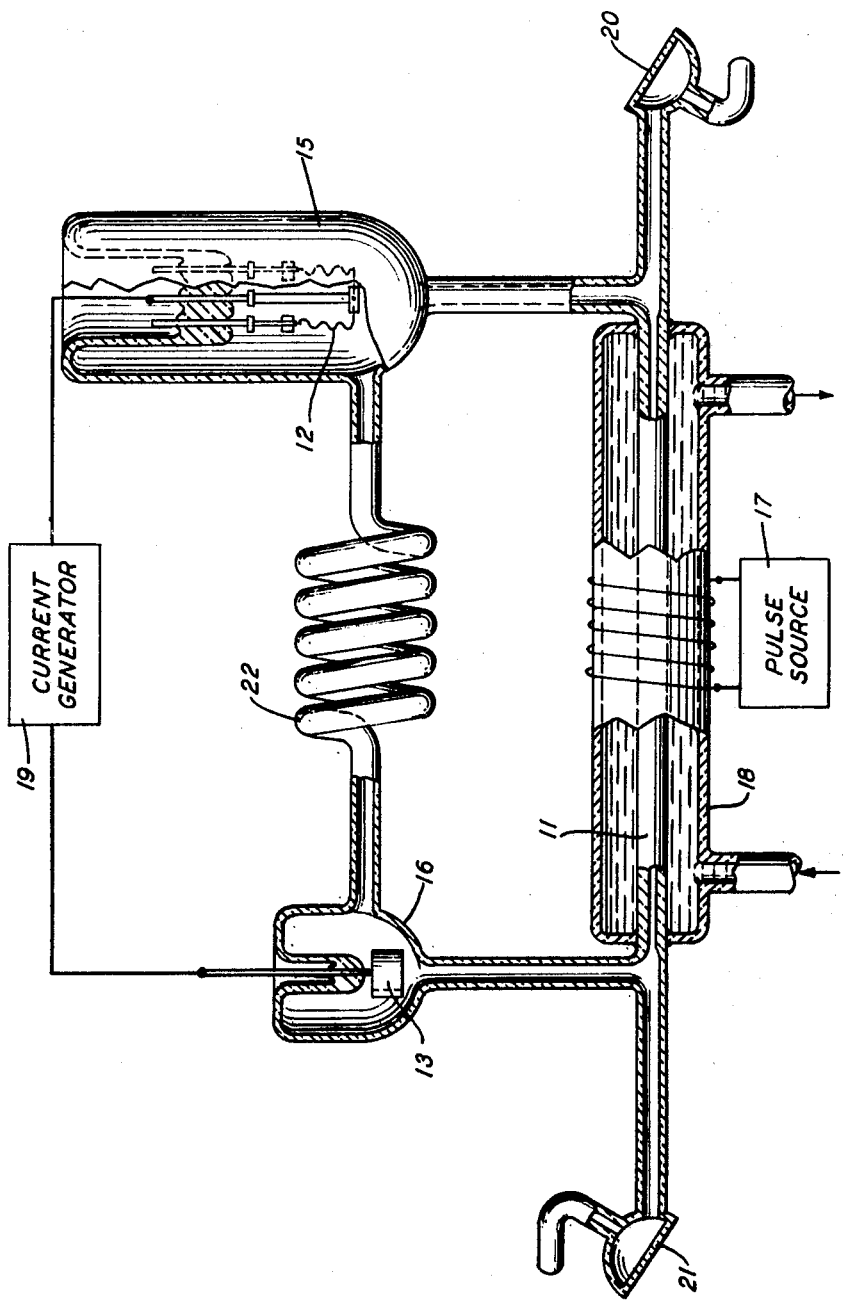
INVENTORS *E. I. GORDON*
*E. F. LABUDA*
BY
*Roderick B. Anderson*
ATTORNEY

DIRECT CURRENT EXCITED ION LASER INCLUDING GAS RETURN PATH

This invention relates to gas lasers.

The laser, also known as the optical maser, is a relatively recent invention of far-reaching technological importance because of its ability to amplify light and to generate coherent oscillations at light frequencies. Through a selective excitation known as pumping, an abnormally high proportion of atoms or other particles within an active medium of the laser is raised to a predetermined high energy state, defining a condition known as population inversion. As the particles decay to lower energy levels they inherently emit radiation at a characteristic frequency. It is possible to stimulate the emission of this radiation at a predetermined frequency for the purpose of generating coherent light or for amplifying light of a frequency corresponding to the radiation frequency.

In the usual form of gas laser, neutral component atoms of a gas plasma active medium are excited by establishing a gas discharge in the gas. The gas discharge may be maintained by applying a radio frequency electric field, or by establishing a direct current between a cathode and an anode, as is done in conventional gas discharge tubes. In either case, the gas discharge region is normally defined by an extended tubulation the axis of which is coincident with the light beam to be generated or amplified. The desired laser action results from in-phase radiation at a specific frequency by a large number of excited neutral atoms as they decay to a lower energy state. The net gain of the device is normally proportional to the total length of the gas plasma through which the resultant light wave propagates.

Improved forms of gas lasers are described in the publications, "Visible Laser Transitions in Hg+" by W. E. Bell, "Applied Physics Letters," Vol. 4, NO. 2,P. 34, Jan. 15, 1964, and "Laser Oscillation in Singly Ionized Argon in the Visible Spectrum," by William B. Bridges, "Applied Physics Letters," Vol. 4, No. 7, P. 128, Apr. 1, 1964. These publications describe devices now generally referred to as ion lasers which use much higher direct electrical current through the gas plasma than do conventional gas lasers. Rather than exciting neutral gas atoms as in the conventional gas laser, the ion laser excites ions of the gas plasma to a condition of population inversion. It has been found that when pulsed direct current electrical discharges are used, the ion laser is capable of generating a significantly higher pulsed output power at higher gain than conventional gas lasers. The ion laser may therefore be substantially shorter than comparable conventional gas lasers, which can be an important advantage.

Efforts to operate the ion laser continuously have been rather disappointing. The output power of the ion laser under continuous operation has been found to decrease as a function of time to a much lower value than the high power initially attained.

It is one object of this invention to attain a steady high output power from a continuously operating ion laser.

We have discovered in investigating the decrease of output power in ion lasers that continuous direct current operation unbalances the gas pressure throughout the device. This results in a gas pressure gradient from the anode to the cathode; part of the laser tube therefore contains a higher than optimum gas pressure, while the remainder is of a lower than optimum gas pressure. As the pressure gradient becomes more pronounced as a function of time, the gain of the device, and hence its output power, decreases and oscillations may actually cease.

It is another object of this invention to equalize the gas pressure within a gas discharge device, particularly, an ion laser These and other objects of the invention are attained in an ion laser of the general type described above. A gas discharge path is defined by a linear discharge tube which extends between enclosures containing the cathode and the anode. A triggering mechanism surrounds or is placed adjacent to the discharge tube to trigger a gas discharge in a known manner. A significantly higher continuous electrical current is transmitted through the discharge region than is true of conventional gas lasers. This high current is capable of exciting an appropriate population inversion of the component ions which results in the stimulated emission of light radiation.

In accordance with the invention, an auxiliary tubulation extends between the cathode enclosure and the anode enclosure to equalize the gas pressures therebetween. In accordance with one feature of the invention, the inside diameter of the auxiliary tubulation is much larger than that of the discharge tube. The mechanical conductance of gas through a tube is proportional to the cube of the inside radius of the tube; the auxiliary tube will therefore transmit gas much more freely than the discharge tube and be highly efficient in equalizing gas pressures.

In accordance with another feature of the invention, the auxiliary tube is much longer than the discharge tube in order to prevent a gas discharge from being formed in the auxiliary tube. The auxiliary tube is preferably helical in shape in order to conserve space. We have also found that for maximum gas transmission through the auxiliary tube, the ratio of inside diameter to the total length of the auxiliary tube should approximately equal the ratio of inside diameter to total length of the discharge tube. Under these conditions, the discharge will be limited to the discharge tube while maximum mechanical gas transmission will occur through the auxiliary tube. Hence, the gas pressure is equalized between the anode and cathode in spite of the tendency of the gas discharge to create a pressure gradient. This gas pressure equalization insures a substantially constant power output through a sustained period of continuous operation.

These and other objects and features of our invention will be more fully appreciated from a consideration of the following detailed description taken in conjunction with the accompanying drawing which is a partially sectioned schematic view of an illustrative embodiment of the invention.

Referring now to the drawing, there is shown a direct-current-excited continuously operable ion laser comprising a discharge tube 11 for defining a linear gas discharge region. A cathode 12 and an anode 13 are located within enclosures 15 and 16, respectively, which are attached to the discharge tube. The device is filled with an appropriate gas which is suitable for population inversion of component ions during discharge. Such a gas may, for example, be argon at a pressure of 0.45 torr (millimeters of mercury). Other noble gases can alternatively be used, as can vaporized mercury or various mixtures of such gases. An appropriate voltage between the cathode and anode maintains a gas discharge path which extends from cathode 12 through discharge tube 11 to anode 13. The gas discharge is triggered in a known manner by electrical energy from a pulse source 17. A water jacket 18 surrounding the discharge tube transmits water to cool the device.

During operation, a relatively high current is generated by a current generator 19 which is transmitted along the gas discharge path by way of discharge tube 11. This high current, which may be, for example, in excess of 4 amperes, causes a substantial part of the gas molecules or atoms within the device to become ionized. Additionally, the ions are excited to a condition of population inversion which is characterized by the existence of an abnormally high proportion of ions at a high, unstable, energy state. As these ions decay to lower, more stable energy states, they radiate light energy at a characteristic frequency in accordance with known laser phenomena.

Located at opposite ends of discharge tube 11 are light transparent windows 20 and 21 which are tilted at a proper "-Brewster angle" for maximizing transmission efficiency. When the device is used an an amplifier, light waves are admitted to tube 11 through either window 20 or 21 and become amplified through the additive effect of the stimulated emission from the excited gas ions. Mirrors may be placed on opposite sides of the window in a known manner for multiplying the amplification or for feeding back a sufficient portion of the energy to permit the device to operate as an oscillator. The mirrors may also be substituted for the windows in an internal mirror configuration.

Since ion lasers have a much greater gain than conventional gas lasers, they can be relatively short and still deliver high output power. The tube of FIG. 1 may, for example, have a discharge length of only 25 centimeters with an inner diameter of the discharge tube of 1.2 millimeters to deliver output power approaching 0.5 watt. The voltage between the cathode and anode may be 300 volts. Gain in the device increases rapidly with tube current, and it appears that, with the modifications of the present invention, the only limitation on output power is the capability of the tube to withstand the high temperature that are generated. The water jacket 18 significantly increases the temperature capacity of the device. Additionally, discharge tube 11 may advantageously be made of quartz or other heat-resistant material.

The device of FIG. 1 is intended for use under conditions of continuous operation, as opposed to pulsed operation. It has been observed that the gain, and hence the output power, of known ion lasers decreases significantly as a function of time when they are operated continuously. Our investigations have shown that this decrease in gain is due to the creation of a pressure gradient from the cathode to the anode. As this pressure gradient becomes more pronounced the mechanism of ion excitation becomes less efficient with a resultant decrease in the gain along the discharge path.

It is our belief that this pressure gradient is caused by a number of factors. At relatively modest currents, positive ions migrate toward the cathode and recombine with electrons to increase the gas pressure in the cathode enclosure over that in the anode enclosure. Another factor is a negative potential which builds up on the inner wall of discharge tube 11 and attracts positive ions while repelling electrons. Rather than giving up their momentum which they have gained from the axial electric field to neutral gas atoms by collision, a relatively large number of positive ions tend to impinge on the inner wall of the tube. On the other hand, most of the electron momentum is imparted to the gas atoms. At higher currents the predominant force exerted on the gas by electrons tends to create a higher gas pressure in the anode enclosure. Moreover, when mixtures of different gases are used as the active medium or gas plasma, a cataphoresis condition may also develop wherein the atoms of one gas tend to migrate predominantly toward the cathode while the atoms of another gas tend to migrate toward the anode. This situation additionally degrades the performance of the laser.

In accordance with the invention, a gas pressure equilibrium is maintained throughout the device by an auxiliary tubulation 22 which interconnects cathode enclosure 15 with anode enclosure 16. This auxiliary tubulation has a higher mechanical conductance of gases than does discharge tube 11, which equalizes gas pressure and prohibits the establishment of a pressure gradient along the discharge tube.

A relatively large mechanical conductance of gas through the auxiliary tube 22 is ensured by making the inside diameter of the auxiliary tube large with respect to that of the discharge tube. It can be shown that $$C \approx r^3/l \quad (1)$$

where $C$ is the mechanical gas conductance of the tube, $r$ is the inside radius of the tube and $l$ the length of the tube. As shown by equation (1), the radius of a tube has a much more pronounced effect on its gas conductance than does its length. Gas is therefore transmitted more readily by the auxiliary tube than the discharge tube as is required for optimum stabilization of gas pressure.

It is also important that the gas discharge by limited to the discharge tube 11, since a gas discharge through the auxiliary tube would degrade the performance of the device. The voltage required for maintaining a gas discharge is given by $$V \approx l/r \quad (2)$$

It can be seen from equation (2) that the voltage required for maintaining a discharge through a tube is inversely proportional to the radius of the tube. The large-radius auxiliary tube 22 must therefore be made longer than discharge tube 11 if a gas discharge breakdown through auxiliary tube 22 is to be prevented. For purposes of compactness, the auxiliary tube 22 is preferably of a helical shape to give the additional length required for preventing a gas discharge therethrough. In addition, the helical structure eliminates strains resulting from differential expansion of the two tubes.

With pulse source 17 being coupled only to discharge tube 11, it is possible for tube 11 and tube 22 to have the same breakdown voltage and still limit the discharge to tube 11. It is therefore possible for the ratio of the length to the radius of auxiliary tube 22 to be equal to the ratio of length to radius of discharge tube 11, or, $$l_1/r_1 = l_2/r_2 \quad (3)$$

where $l_1$ is the length of auxiliary tube 22, $r_1$ is the inside radius of the auxiliary tube, $l_2$ is the length of discharge tube 11, and $r_2$ is the inside radius of discharge tube 11. Conformance with equation (3) permits a large inside radius of auxiliary tube 22 as is required for maximum mechanical gas conductance together with a minimum total length for the auxiliary tube. If the pulse source is not used for restricting the gas discharge to discharge tube 11, then a higher resistance to gas discharge breakdown should be provided in the auxiliary tube 22. This is done by complying with the relationship $$l_1/r_1 > l_2/r_2 \quad (4)$$

It should be clear that the described technique has application to other forms of gas discharge devices wherever an undesirable pressure gradient is established between spaced regions of the gas discharge. It is also to be understood that the particular ion laser shown and described has been presented merely for purposes of illustration. Various other arrangements may be made by those skilled in the art without departing from the spirit and scope of the invention.

We claim:

1. An ion laser comprising:
a linear discharge tube;
said tube being filled with a quantity of gas which is capable of population inversion in an ionized condition;
means for establishing a substantially continuous gas discharge through said gas;
means for maintaining a sufficiently high current flow through said gas to ionize a significant proportion of said gas and to establish a population inversion of component ions;
enclosures attached to opposite ends of said discharge tube;
and means for equalizing the gas pressures along said discharge tube comprising an auxiliary tube interconnecting said enclosures.

2. The ion laser of claim 1 further comprising:
a cathode within one of said enclosures;
an anode within the other enclosure;
and means for restricting said gas discharge to said discharge tube comprising an electrically pulsed trigger device which is closely adjacent to only the discharge tube.

3. The ion laser of claim 1 wherein:
the auxiliary tube has a substantially larger inside radius and a substantially longer total length than the discharge tube.

4. The ion laser of claim 3 wherein:
the ratio of inside radius to total length of the auxiliary tube is substantially equal to that of the discharge tube.

5. The ion laser of claim 3 wherein the auxiliary tube is of a helical shape.

6. A gas discharge device comprising:
a linear discharge tube;
a first enclosure connected to one end portion of the discharge tube and containing a cathode;
a second enclosure connected to another end portion of the discharge tube and containing an anode;
said tube being filled with a quantity of gas;
means for establishing a gas discharge through said gas;

means for maintaining a sufficiently high current flow through said gas to ionize a major proportion of said gas and to establish a population inversion of component ions, thereby initiating the stimulated emission of coherent optical radiation from at least part of the component ions of said gas;

and means for equalizing the gas pressure along said discharge tube comprising an auxiliary tube interconnecting said enclosures;

the inside diameter of the auxiliary tube being substantially larger than that of the discharge tube and the length of the auxiliary tube being substantially longer than that of the discharge tube.

7. The gas discharge device of claim 6 wherein:

the ratio of inside diameter to total length of the auxiliary tube is substantially equal to that of the discharge tube;

and further comprising an electrically pulsed trigger mechanism for exciting a pulsed electric field substantially only in part of the discharge tube.

8. An ion laser comprising:

a linear hollow discharge tube;

a first enclosure connected to one end portion of the discharge tube and containing a cathode;

a second enclosure connected to another end portion of the discharge tube and containing an anode;

said discharge tube being filled with a quantity of gas which is capable of population inversion in an ionized condition;

means including said cathode and anode for establishing a gas discharge through said gas;

means for maintaining a sufficiently high current flow through said gas to ionize a significant proportion of said gas and to establish a population inversion of component ions, thereby initiating the stimulated emission of coherent optical radiation from at least part of the component ions of said gas;

the ionization of said gas resulting in a migration of gas particles predominantly to one of said enclosures;

and means for equalizing the gas pressure along said discharge tube in spite of said migration comprising a substantially helically shaped hollow auxiliary tube interconnecting the first and second enclosures;

the inner diameter of the auxiliary tube being substantially larger than the inner diameter of the discharge tube;

and the helical length of the auxiliary tube being substantially longer than the length of the discharge tube.

9. An ion laser comprising:

an enclosure including a cathode at one end, an anode at an opposite end, and means for defining a linear discharge region between the cathode and anode;

said enclosure being filled with a quantity of gas which is capable of population inversion in an ionized condition;

means including said cathode and anode for establishing a substantially continuous gas discharge through said discharge region;

means for maintaining a sufficiently high current flow through said gas to ionize a significant proportion of said as and to establish a population inversion of component ions thereby initiating the stimulated emission of coherent optical radiation from at least part of the component ions of said gas;

the ionization of said gas resulting in a migration of gas particles predominantly toward one end of said enclosure;

and means for equalizing the gas pressure along the gas discharge region in spite of said migration comprising means for defining a gas transmission path between the anode and cathode which is distinct from said gas discharge region and which has a higher mechanical gas conductance than the gas discharge region.

10. An ion laser comprising:

an enclosure including a cathode at one end, an anode at an opposite end, and means for defining a discharge path between the cathode and anode, a major portion of the path being linear, said enclosure being filled with a quantity of gas which is capable of population inversion in an ionized condition;

means including said cathode and anode for establishing a gas discharge along said discharge path;

means for maintaining a sufficiently high current through said gas to ionize a significant part of the gas and to establish a population inversion of component ions, thereby initiating the stimulated emission of coherent optical radiation from at least part of the component ions of said gas;

the ionization of said gas resulting in a migration of gas particles predominantly toward one end of said discharge path; and means for equalizing the gas pressure along the gas discharge path in spite of said migration comprising means for defining a gas transmission path between the anode and cathode which is distinct from said gas discharge path, which is longer than said gas discharge path and which has a higher mechanical gas conductance per unit length than the gas discharge path.

11. In a direct-current-excited gas laser including a negative temperature medium and an energy-abstracting means, the improvement comprising:

at least one elongated hollow laser tube, having a first closed end and a second closed end;

a first hollow elongated closed end terminal tube extending from said laser tube near the first closed end of said laser tube and with the longitudinal axis of said first terminal tube at an angle with the longitudinal axis of said laser tube, the interior of said first terminal tube being in communication with the interior of said laser tube to which it is joined;

a second hollow elongated closed end terminal tube extending from said laser tube near the second closed end of said laser tube and with the longitudinal axis of said second terminal tube at an angle with the longitudinal axis of said laser tube, the interior of said second terminal tube being in communication with the interior of said laser tube to which it is joined;

an anode within said first terminal tube;

a cathode with said second terminal tube;

said anode and said cathode having connecting means extending through said first and said second terminal tubes for joining said anode and said cathode to a direct current power supply;

and at least one passage means for providing a passage for the return flow and neutralization of heavy gas concentrating at said cathode during normal operation of said laser, said passage means having greater resistance than said laser tube to electrical discharge from said cathode to said anode.